United States Patent [19]
Potts et al.

[11] Patent Number: 5,088,535
[45] Date of Patent: Feb. 18, 1992

[54] BICYCLE OR MOTORCYCLE TIRE TREAD

[75] Inventors: Stephen M. Potts; Mark J. Slate, both of Mill Valley; Charles B. Cunningham, Fairfax; James H. Merz, Morgan Hill, all of Calif.

[73] Assignee: Specialized Bicycle Components, Inc., Morgan Hill, Calif.

[21] Appl. No.: 529,785

[22] Filed: May 25, 1990

Related U.S. Application Data

[63] Continuation of Ser. No. 267,683, Nov. 2, 1988, abandoned, which is a continuation of Ser. No. 907,370, Sep. 11, 1986, abandoned, which is a continuation-in-part of Ser. No. 906,834, Sep. 10, 1986, abandoned.

[51] Int. Cl.⁵ .............................................. B60C 11/11
[52] U.S. Cl. .............................. 152/209 B; 152/209 R; D12/140
[58] Field of Search ............................ D12/136, 140; 152/209 R, 209 B, 209 D

[56] References Cited

U.S. PATENT DOCUMENTS

| | | | |
|---|---|---|---|
| D. 254,367 | 3/1980 | Kamiya | D12/136 |
| D. 268,339 | 3/1983 | Inae et al. | D12/136 |
| D. 282,454 | 2/1986 | Tsai | D12/136 |
| 3,842,879 | 10/1974 | Mills et al. | 152/209 R |

FOREIGN PATENT DOCUMENTS 2148213 5/1985 United Kingdom ........... 152/209 D

Primary Examiner—Geoffrey L. Knable
Attorney, Agent, or Firm—Philip A. Dalton; Milton W. Schlemmer

[57] ABSTRACT

An improved bicycle tire tread comprising selected combinations of tread block and trough dimensions and concave, convex and beveled tread surface configurations, is disclosed.

12 Claims, 3 Drawing Sheets

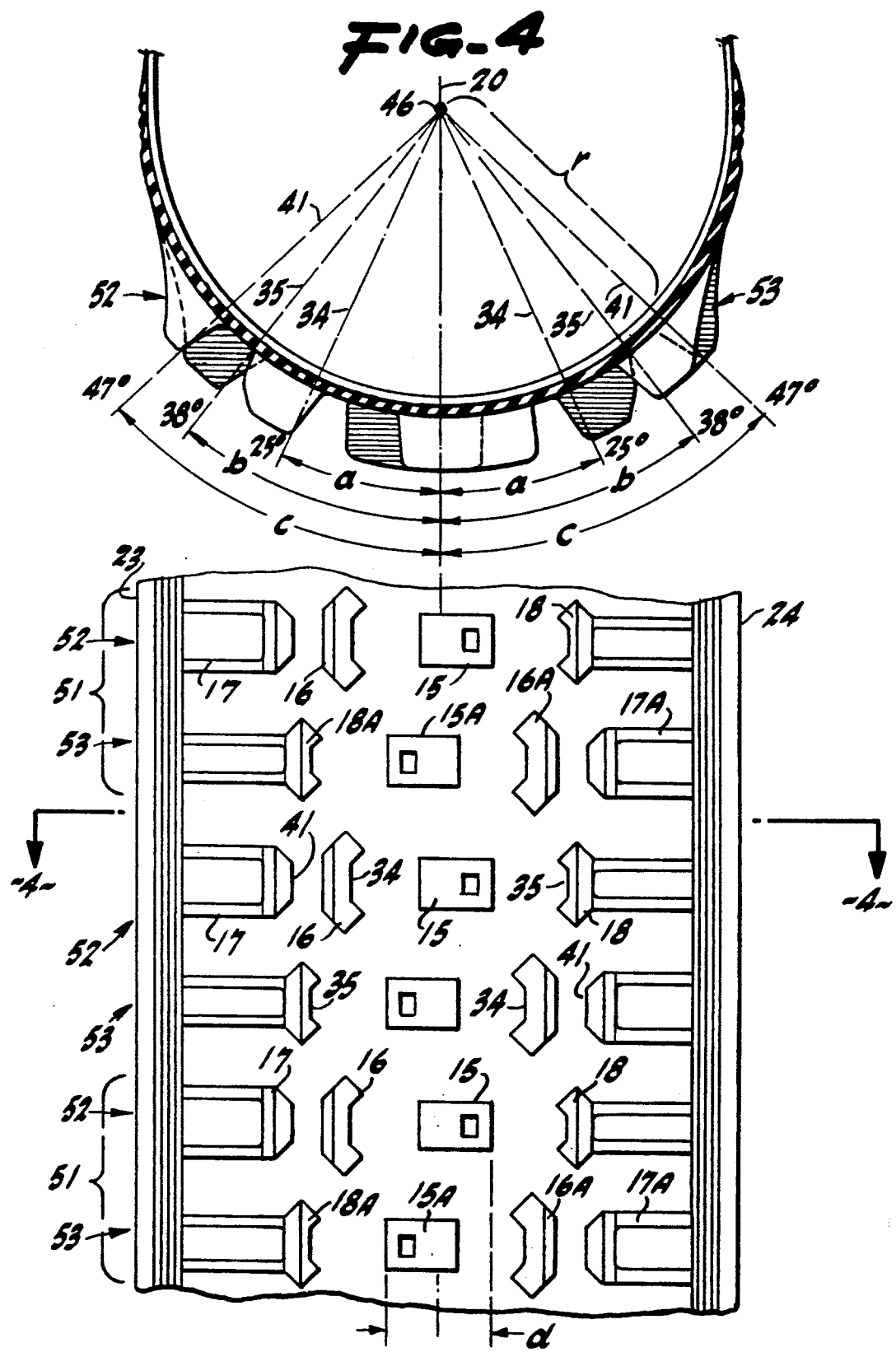

BICYCLE OR MOTORCYCLE TIRE TREAD

This is a continuation of application Ser. No. 267,683, filed Nov. 2, 1988, now abandoned, which is a continuation of U.S. application Ser. No. 907,370, filed Sep. 11, 1986, now abandoned, which is a continuation-in-part of U.S. application Ser. No. 906,834, filed Sep. 10, 1986, now abandoned.

BACKGROUND OF THE INVENTION

This is a continuation-in-part of commonly assigned U.S. Pat. application, Ser. No. 906,834, entitled TIRE TREAD AND TIRE, filed Sept. 10, 1986, in the name of inventors, STEPHEN M. POTTS, MARK J. SLATE, CHARLES B. CUNNINGHAM and JAMES H. MERZ (Our File A-43524/MWS/PAD).

The present invention relates to tires for vehicles such as bicycles and motorcycles and, in particular, to a tire tread construction for off-road bicycle tires.

It is difficult to obtain adequate bicycle tire traction (and adequate traction without clogging), particularly for off-road or mountain riding. The primary reason is simply that the small size and, in particular, the small lateral size of bicycle tires limits the available tread surface area.

SUMMARY OF THE INVENTION

In view of the above discussion, it is a primary object of the present invention to provide an off-road or mountain bicycle tire tread configuration which provides improved lateral traction, controllable drifting, and improved peripheral or circumferential traction, including braking and accelerating (climbing) traction.

It is also an object of the present invention to provide a tire with the above-described advantages which also provides a supple ride.

It is a further object of the present invention to provide a tire, as described above, which has a large distance between tread edges to contribute to traction and to resistance to clogging.

In one aspect, our present invention relates to a tire tread comprising a repetitive circumferential pattern of laterally aligned first and second traction blocks having respective facing edges which are spaced a selected distance for permitting the road surface to slide over the first block into gripping engagement against the side edge of the second block during lateral movement such as cornering.

In another preferred aspect, a staggered array or column of alternating left and right offset center blocks is used to provide the requisite center tread block spacing and size for braking and acceleration traction. This increases the effective width of the center blocks to that of the center block column.

In addition, and preferably, left and right columns of tread blocks are provided adjacent the center block column, aligned laterally with the blocks of the center block and having facing concave inner edges to increase lateral traction. The front and rear surfaces of the side blocks may be convex to increase the lateral surface area and thus contribute to braking and acceleration traction. An additional outer column of tread blocks may be provided comprising tread blocks on each side of the tire, or tread blocks alternating on each side of the tire, to further increase lateral traction.

In a presently preferred working embodiment, selected ones of the tread blocks of the intermediate columns have beveled outer surfaces and the intermediate and outer columns comprise a staggered array of tread blocks for gripping the ground surface in sequential steps and further enhancing cornering or lateral traction and drift control.

BRIEF DESCRIPTION OF THE DRAWINGS

The above and other features of the present invention are described in conjunction with the drawings in which:

FIG. 3 depicts an alternative embodiment of the bicycle tire tread shown in FIG. 1; and FIG. 4 is a cross-sectional view taken along line 4—4 in FIG. 1.

DETAILED DESCRIPTION OF THE INVENTION

Overall Tread Pattern 10

Figure 1:
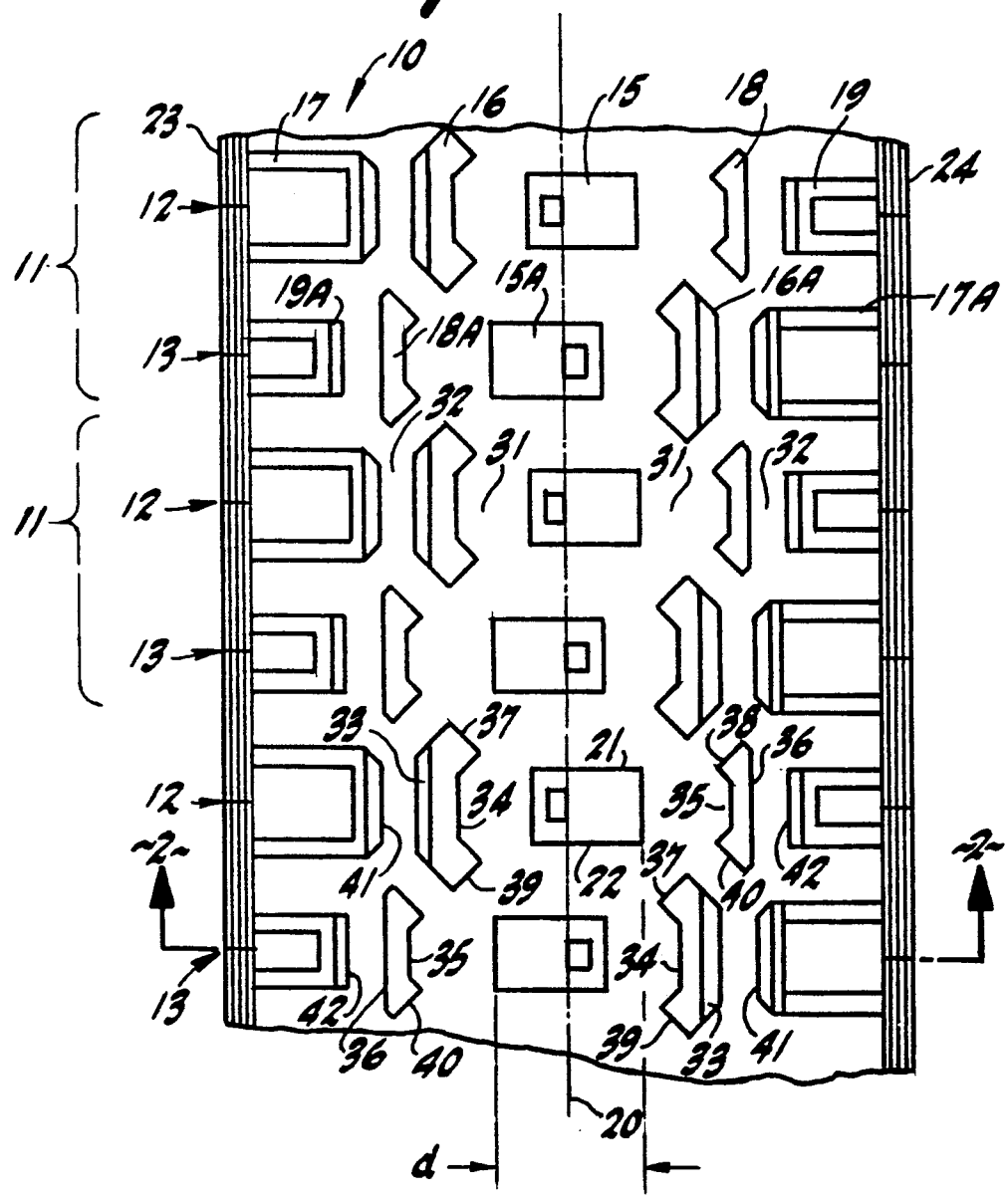
FIG. 1 depicts a bicycle tire embodiment of our tire tread pattern, illustrated with the tread laid flat from left bead to right bead.

FIG. 1 depicts one preferred embodiment 10 of our tire tread pattern as used in bicycle tires. The figure is approximately to scale and shows the tire laid flat from bead to bead to facilitate understanding of the configuration and size of, and the spacing between the various tread traction blocks.

The tire tread pattern 10 comprises a pattern of circumferentially-repeated identical arrays 11—11. Each array contains two circumferentially adjacent rows 12 and 13 of tread blocks. The first row 12 includes a generally rectangular center block (first block) 15, and left side intermediate/inner block (second block) 16 and outer block (third block) 17 which are positioned to the left of the tire tread center line 20. (The intermediate and outer blocks 16 and 17 are also collectively termed left side outer blocks.) The first row 12 also includes right side intermediate (second) and outer (third) blocks 18 and 19 or, collectively, right side outer blocks. The second row 13 is the reverse, mirror image of the first row 12 and includes a corresponding center block 15A, corresponding intermediate (second) and outer (third) blocks 16A and 17A located on the right side of the tire center line, and corresponding intermediate (second) and outer (third) blocks 18A and 19A on the left side.

The center blocks 15 and 15A of the two rows are offset laterally. This increases the effective lateral width of the center block front and rear edges 21 and 22 to the overlapping width of the two center blocks without decreasing the spacing between laterally adjacent blocks. That is, the staggered center blocks provide a column in which the effective width of the front and rear tread block edges is equal to the column width, d. As a result, the circumferential traction, including braking and acceleration traction, provided by the front and rear tread edges of the center block column is increased.

The above-described tread pattern can in fact be considered a five column pattern in which each column comprises alternating left and right, offset tread blocks. Thus, starting from the left bead 23 and progressing to the right bead 24 in FIG. 1, the first column comprises a pattern of repeated elements in which the basic element contains the outer block 17 and the outer block 19A. Similarly, the pattern element of the second column comprises the intermediate block 16 and the leftwardly staggered intermediate block 18A. Likewise, the pattern element of the third column comprises the center block 15 and the staggered center block 15A, while that of the fourth column is defined by the right intermediate block 18 and the leftwardly offset intermediate block 16A, and the fifth column is defined by the right outer block 19 and the outer block 17A.

INDIVIDUAL TREAD CONFIGURATIONS; LATERAL TRACK ENHANCEMENT

Figure 2:
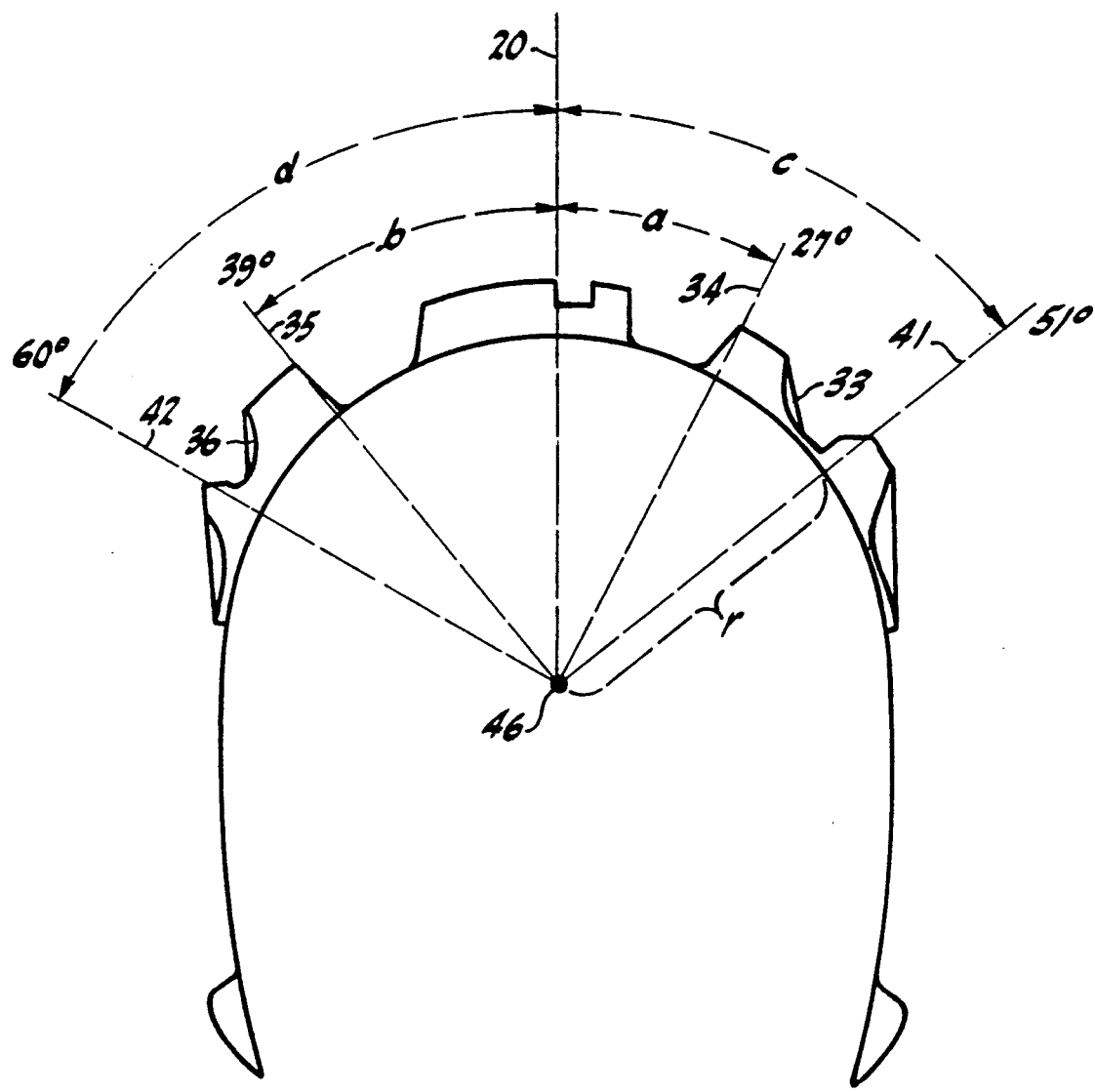
FIG. 2 is a cross-sectional view taken along line 2—2 in FIG. 1 through one of the two individual, circumferentially adjacent, laterally staggered rows which define the basic element or array of the tire tread pattern.

The present invention and the embodiment 10 thereof shown in FIGS. 1 and 2 incorporate several features which increase lateral and circumferential (forward/rear) traction. First, a large trough distance is used between the blocks and, specifically, between the facing side edges of adjacent blocks. As a consequence, during cornering the ground surface can drop into the trough such as 31 or 32 between the outer edge of one block and the inner edge of the adjacent block, then bite into the inner edge of the outer block.

Secondly, beveled outer edges 33 are used to facilitate the above-described gripping action. The beveled edges make it easier for the ground surface to ride over the beveled inner tread block into the trough and against inner edge of the next adjacent outer tread block.

Thirdly, concave inner tread block edges 34 and 35 are used to increase the surface area of the inner edge and thus also enhance the gripping action between the ground surface and that inner edge. Finally, but not exhaustively, convex front edges 37 and 38 and convex rear edges 39 and 40 are used where possible to increase the effective edge length and the circumferential traction.

The present invention contemplates the use of various combinations of these four features determined, for example, by the available space and the size of the tread blocks to enhance lateral and circumferential traction. Considering as a specific example the tire tread embodiment 10 of FIG. 1, the crucial distances $d_{31}$ between the center block 15 and the adjacent intermediate block 16 or 18 (and between center block 15A and block 16A or 18A) is relatively large to maximize biting engagement of the ground surface against the inner surface of that next adjacent outer block. Similarly, the distances $d_{32}$ between the intermediate blocks 16, 16A, 18 and 18A and the adjacent outer blocks 17, 17A, 19 and 19A are relatively smaller but still sufficiently large to provide good lateral traction and enhance the transition from traction to break-away.

In addition, the inner edges 34 of the intermediate blocks 16 and 16A and the inner edges 35 of the intermediate blocks 18 and 18A are generally concave to enhance gripping engagement of these edges by the ground surface and, thus, to enhance lateral traction.

As mentioned, the outer edges 33 of the intermediate blocks 16 and 16A are beveled to facilitate gripping engagement by the ground surface and thus enhance lateral traction. In a larger tire where space permits, the smaller non-beveled treads 18 and 18A could be replaced by treads 16 and 16A, but the lack here is offset by the staggered arrangement which alternates the blocks 16 and 16A and their beveled edges 33 on the left and right hand side of the tread pattern. Thus, at least every other intermediate block in a circumferential column of intermediate blocks is one of the larger blocks 16 and 16A, which have concave inner edges 34 of greater circumferential length than the adjacent edges of center blocks 15 and 15A (FIG. 1).

Finally, as mentioned, the forward edges 37 of tread blocks 16 and 16A and the forward edges 38 of tread blocks 18 and 18A are generally convex shaped (illustratively, triangular) to increase the effective biting length of the forward edge without substantially increasing the tread block width. Similarly, the rear edges 39 of tread blocks 16 and 16A and the rear edges 40 of tread block 18 and 18A are also convex or triangular. As is known in the technology, forward tread edges contribute to accelerating traction and the rear edges contribute to braking traction. Accordingly, both types of traction are enhanced by this increased edge length.

Block Angular Locations

Referring further to FIGS. 1 and 2, for cornering traction, the sequential working edges 34, 35, 41 and 42 of the left and right side tread side blocks are located in precise angular positions to bite properly at all bicycle lean angles up to and beyond the slide point. The associated angles a, b, c and d are defined between the tire center line 20 and the edge lines 34, 35, 41 and 42 between the respective, like numbered tire edges and the center of curvature, 46, of the tread mould of radius, r. (Please note that FIG. 2 is taken through row 13 and shows angles b, d and a, c on opposite sides of the tire center line 20. However, the two adjacent rows 12 and 13 provide the four angle tread sequence a, b, c and d on both sides of the center line 20.) In a working embodiment, the values of the angles a, b, c and d were respectively approximately 27°, 39°, 51° and 60°. These values of the angles a, b, c and d were selected based upon the upper and lower limits of predictable tire drift. These preferred limits exist within a relatively narrow range of measurements, approximately ±3° of the stated values. Increasing the angles has the effect of decreasing the rider's ability to let the tire drift in small predictable increments. Rather, the tire drifts in large unpredictable steps. Decreasing the angles results in greatly increased loss of traction and allows the road surface to slide over the tops of the tread blocks without engaging the next "working edge". Sudden and dramatic loss of traction occur at extreme lean angles. Here, a, b, c and d values of 27°, 39°, 51° and 60° (taken from the vertical) for the four inner working edge positions 34, 35, 41 and 42 enhance the ability of these inner working edges to bite in four smoothly integrated stages. This provides exceptional lateral traction without a sharp break-away point, i.e., provides controllable drifting without sudden slides.

RELIEF SCULPTING AND TREAD BLOCK HEIGHT

As shown in the cross-sectional view of FIG. 2, the outer block outer edges such as 33 and 36 are sculpted. That is, the outer surfaces are concave. The sculpting lightens the tire by removing essentially useless rubber (side tread wear is low compared to the center tread so that the side rubber density can be reduced without decreasing the life of the tire). Also, the tread block sculpting, the unique bucket or concave shape of the inner edges and the flexible hinge lines and lack of continuous center tread between the tread blocks, all contribute to suppleness. This provides a more comfortable ride but also allows the tread to grab irregular surfaces better and otherwise provides better cornering, braking and climbing traction.

Referring further to FIG. 2, the heights of the outer tread blocks (16, 18A, 17 and 19A on the left side and 16A, 18, 17A and 19 on the right side) increase progressively from the center towards the bead of the tire. This center-to-bead height progression provides a large contact patch when leaned over, which makes the tire predictable and forgiving when pressed into a slide. Also, the high narrow outer blocks act as a rubber cushion if a tire smashes into a rock or other obstacle to help prevent tube pinch. The outermost tall blocks have ribbed sections that extend around to protect the sidewall casing from cuts and scrapes.

In addition, the sculpting and progressively raised outer blocks decrease interference between blocks.

In one exemplary working example, the tire tread pattern 10 was implemented in a 1.95 inch wide off-road tire formed using a 1.0 mm (millimeter) base rubber specification range of (1.0 mm–1.8 mm), 66 threads-/inch nylon casing, and a wire bead. The tread block width and length was 14.5 mm × 10.0 mm for blocks 15 and 15A, 7.5 mm × 21.0 mm for blocks 16 and 16A, 16.0 mm × 15.0 mm for blocks 17 and 17A and 5.0 mm × 17.5 mm for blocks 18 and 18A. In addition, the $d_{31}$ and $d_{32}$ between the blocks was 10.5 mm and 20.5 mm. The block size (width) and the trough spacing provided angular locations for the working inner edges of the side blocks of a=27°, b=39°, c=51°, and d=60°.

FIGS. 3 and 4 depict an alternative working embodiment 50 of the tread configuration 10 shown of FIGS. 1 and 2. In tread 50, pattern element 51 corresponds to pattern element 11 of tire tread 10, FIG. 1. In addition, rows 52 and 53 correspond to rows 12 and 13 of tire tread 10. In tire tread 50, outer blocks 19 and 19A are not used in the respective rows 52 and 53. As a result and proceeding from left bead 23 to right bead 24, the five circumferential tread columns comprise first, tread 17 in alternating rows 52; second, staggered treads 16 and 18; third, staggered center treads 15 and 15A; fourth, staggered treads 18 and 16A; and fifth, tread 17A in alternating rows 53. As a result, as shown in FIG. 4, there is a sequence of three (rather than four) laterally spaced tread blocks in each pattern element 11 on the left and right of the center block column: tread 16, 18A and 17 on the left side and 16A, 18 and 17A on the right side. The approximate angles associated with the resulting three tread working edges on each side of the tire are a=25°, b=38° and c=47°.

In addition, in tread 50, the tread sizes are reduced approximately ten percent relative to those described above for tire tread 10.

These features help make the tire tread 50 a lighter weight, more supple design than is tread 10. Also, they slightly increase the width of the troughs between the tread blocks and, thus, increase the resistance to trough clogging.

In a working example of the tire tread 50, the dimensions and other specifications described above regarding the exemplary working example of tire tread 10 were incorporated except that, as described above, the tread sizes were reduced ten percent, treads 19 and 19A were eliminated, and the tread working edge angular locations were, 25°, 38° and 47°. As a result, tires employing tire tread pattern 50 provided enhanced resistance to clogging by mud and other debris and generally increased performance in the performance areas described above.

The foregoing description of the preferred and alternative embodiments of the invention is presented for purposes of illustration and description. It is not intended to be exhaustive or to limit the invention to the precise forms disclosed. Obviously, many modifications and variations are possible in light of the above teaching. For example, the use of (1) the staggered center blocks and/or (2) the center block-to-intermediate block spacing and/or (3) concave blocks and/or (4) beveled blocks will individually or collectively provide benefits over conventional tire treads. The preferred embodiment was chosen and described in order to best explain the principles of the invention and its practical application to enable others skilled in the art to best utilize the invention and various embodiments and with various modifications as are suited to the particular use contemplated. It is, thus, intended that the scope of the invention be limited only by the claims.

We claim:

1. A bicycle or motorcycle tire having a tread comprising:
   (a) a first circumferential column of alternating left and right offset, center traction blocks for increasing the effective width of the column while maintaining a predetermined spacing from laterally adjacent tire features;
   (b) second and third circumferential columns of elongated blocks spaced laterally outside and on opposite sides of the first column, individual second and third blocks being aligned laterally with a corresponding center block to form a lateral row and being spaced a selected distance from the adjacent corresponding center block;
   (c) the second and third blocks having an outer edge and a concave inner edge, the inner edge facing an adjacent edge of the corresponding center block, the circumferential length of said inner edges of at least every other second and third block in each of the circumferential columns of second and third blocks being greater than the circumferential length of said adjacent edges and being spaced a selected distance from said adjacent edges, to enhance lateral traction;
   (d) fourth and fifth circumferential columns of blocks spaced laterally outside the second and third columns, respectively, the fourth and fifth blocks being laterally aligned with corresponding first, second and third blocks in a lateral row, and having an inner edge spaced a selected distance from the corresponding second and third blocks for enhancing lateral traction;
   (e) at least alternating ones of the blocks of the second and third columns having beveled outer edges for increasing lateral traction; and
   (f) at least selected blocks of at least the second and third columns having convex front and rear edges for increasing circumferential traction.

2. The tire tread of claim 1 wherein the convex front and rear edges are triangular.

3. A bicycle or motorcycle tire having a tread comprising a circumferential pattern of repetitive arrays of alternating first and second laterally extending tread block rows,
   (a) each of the first row and the second row of tread blocks comprising a pair of left and right outer tread blocks, a pair of left and right intermediate tread blocks and a center tread block, the center tread block being between and adjacent the left and right intermediate tread blocks and the outer, intermediate and center tread blocks defining five circumferential columns;

(b) the center tread blocks of the first and second rows being offset laterally relative to one another to increase the effective width thereof;

(c) each center tread block having laterally extending front and rear edges and circumferentially extending left and right side edges, each intermediate tread block having laterally extending front and rear edges, a circumferentially extending outside edge and a circumferentially extending inside edge facing an adjacent side edge of the center tread block in that row, and each outer tread block having generally laterally extending front and rear edges and a circumferentially extending inside edge;

(d) at least selected ones of the front and rear edges of the intermediate blocks being generally convex;

(e) the inside edges of the intermediate blocks and the inside edges of the outer blocks being located at approximate respective angles of 27°, 39°, 51° and 60° defined by the tire center line and the tread center of curvature;

(f) the intermediate block inside edges being concave and the circumferential length of at least every other intermediate block in each circumferential column of intermediate blocks being greater than the circumferential length of the facing side edge of the adjacent center tread block; and (g) at least alternating left side and right side intermediate blocks having beveled outside edges for increasing lateral traction.

4. A bicycle or motorcycle tire having a tread comprising a circumferentially repeated pattern of first and second laterally-extending rows of tread blocks;

each of the first row and the second row of tread blocks comprising a center tread block and left and right tread blocks laterally adjacent to and aligned with the center tread block; the center tread blocks of the first and second rows being laterally off-set relative to one another; each center tread block having circumferentially-extending left and right side edges facing the right and left side edges respectively of the left and right tread blocks in the same row and the left and right tread blocks having circumferentially-extending inside edges laterally aligned with the left and right side edges of the associated center tread block;

the inside edges of the right and left tread blocks having a section which is concave, the length of the concave section extending in the circumferential direction, and the circumferential length thereof for at least every other tread block in each circumferential column of right and left tread blocks being greater than the circumferential length of the facing side edge of the adjacent center tread block; and said left and right tread blocks having laterally-extending convex front and rear edges.

5. The tire tread of claim 4, wherein each of the first and second rows further comprise outer tread blocks located laterally outside the left and right side tread blocks.

6. The tire tread of claim 6, wherein the left and right tread blocks and the outer tread blocks of the first and second rows are laterally off-set or staggered relative to one another in the manner of the center tire tread blocks such that the first and second rows are laterally off-set relative to one another and such that the left and right side tread blocks and the outer tread blocks in the first and second rows are aligned with the between-block spaces in the second and first rows.

7. The tire tread of claim 6, wherein the inside edges of the left and right side tread blocks are alternately located at angles of approximately 39° and 27° defined by the tire center line and the tread center of curvature and wherein the inside edges of the left and right side outer tread blocks are located at angles of approximately 60° and 51°.

8. The tire tread of claim 6 or 7, wherein alternating left and right side tread blocks of the first and second rows have beveled outer edges.

9. The tire tread of claim 4, wherein the first and second rows each include an outer tread block located, respectively, laterally outside the left tire tread block in the first row and laterally outside the right tire tread block in the second row.

10. The tire tread of claim 9, wherein the left and right side tread blocks and the outer tread blocks in the first and second rows are laterally off-set relative to one another in the manner of the center tire tread blocks such that the first and second rows are laterally off-set relative to one another and such that the left and right tread blocks and the outer tread blocks in the first and second rows are aligned with the between-block spaces in the second and first rows.

11. The tire tread of claim 10, wherein the inside edges of the left tread blocks in the first and second rows are located at respective angles of approximately 25° and 38° relative to the tire center line and the tread center of curvature; the right tread blocks in the first and second rows are located at respective angles of about 38° and 25°; and the outer tread blocks in the first and second rows are located at an angle of approximately 47°.

12. The tire tread of claim 10 or 11, wherein alternating left and right tread blocks of the first and second rows have beveled outer edges.

* * * * *